United States Patent
Wagner

(10) Patent No.: US 11,215,218 B2
(45) Date of Patent: Jan. 4, 2022

(54) CABLE ACCUMULATOR

(71) Applicant: Husqvarna AB, Huskvarna (SE)

(72) Inventor: Mark Wagner, Harrisburg, NC (US)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 17/051,593

(22) PCT Filed: Jul. 30, 2019

(86) PCT No.: PCT/IB2019/056496
§ 371 (c)(1),
(2) Date: Oct. 29, 2020

(87) PCT Pub. No.: WO2020/104865
PCT Pub. Date: May 28, 2020

(65) Prior Publication Data
US 2021/0246933 A1 Aug. 12, 2021

Related U.S. Application Data

(60) Provisional application No. 62/769,762, filed on Nov. 20, 2018.

(51) Int. Cl.
*F16C 1/10* (2006.01)
*A01D 34/82* (2006.01)
(Continued)

(52) U.S. Cl.
CPC ............ *F16C 1/101* (2013.01); *A01D 34/822* (2013.01); *F16C 1/106* (2013.01); *A01D 34/64* (2013.01); *A01D 2101/00* (2013.01)

(58) Field of Classification Search
CPC ........ F16C 1/101; F16C 1/106; A01D 34/822; A01D 34/64; A01D 2101/00
See application file for complete search history.

(56) References Cited

U.S. PATENT DOCUMENTS 4,141,220 A 2/1979 Feucht
4,920,819 A * 5/1990 Uchida .................. B63H 21/22
74/480 B
(Continued)

FOREIGN PATENT DOCUMENTS

DE 10008963 C1 5/2001
EP 2400171 A1 12/2011
(Continued)

OTHER PUBLICATIONS

International Search Report and Written Opinion from related international application PCT/IB2019/056496, dated Feb. 11, 2020, all pages cited in its entirety.

*Primary Examiner* — Kevin Hurley
*Assistant Examiner* — Marlon A Arce
(74) *Attorney, Agent, or Firm* — Burr & Forman, LLP

(57) ABSTRACT

A cable accumulator for a plurality of input cables and at least one output cable includes a bracket and a carrier member slidably coupled with the bracket. The carrier member includes a frame having a first end and a second end. The second end of the frame is coupled to the at least one output cable. A plurality of connecting members are slidably coupled with a pin member. The plurality of connecting members slide relative to the pin member independently of each other. Actuation of any one of the input cables causes the respective connecting member to pull the pin member to slide the carrier member relative to the bracket and to actuate the at least one output cable. Further, the respective connecting members coupled to non-actuated input cables slide relative to the pin member in response to actuation of any one of the plurality of input cables.

16 Claims, 8 Drawing Sheets

(51) Int. Cl.
*A01D 34/64* (2006.01)
*A01D 101/00* (2006.01)

(56) References Cited

U.S. PATENT DOCUMENTS

| | | | | |
|---|---|---|---|---|
| 5,065,568 | A * | 11/1991 | Braun | A01D 34/64 56/14.9 |
| 5,878,626 | A * | 3/1999 | Gutierrez | B60T 11/06 74/500.5 |
| 7,350,870 | B2 * | 4/2008 | Bates | B60N 2/0881 297/463.1 |
| 10,550,877 | B2 * | 2/2020 | Yoshida | F16C 1/14 |
| 10,920,820 | B2 * | 2/2021 | Ficyk | F16C 1/106 |
| 2017/0254354 | A1 | 9/2017 | Carabalona | |
| 2018/0216657 | A1 | 8/2018 | Sho | |

FOREIGN PATENT DOCUMENTS

| | | | |
|---|---|---|---|
| EP | 1552979 | B1 | 10/2014 |
| GB | 197388 | A | 5/1923 |

\* cited by examiner

CABLE ACCUMULATOR

CROSS REFERENCE TO RELATED APPLICATION

This application claims priority to U.S. application No. 62/769,762 filed Nov. 20, 2018, the entire contents of which are hereby incorporated by reference in its entirety.

TECHNICAL FIELD

The present disclosure relates to a cable accumulator. More specifically, the present disclosure relates to a structural arrangement of a cable accumulator.

BACKGROUND

Machines, such as lawn mowers, may use different components or mechanisms to transfer motion between parts. For example, a lawn mower may utilize a cable or wire to transfer motion between a steering wheel or lever and one or more wheels and/or transmission assemblies. Moreover, more than one system or part of a machine (e.g., multiple levers) may provide inputs into the same receiving system or part. A mechanism is needed for accumulating inputs into a machine and providing appropriate outputs to receiving parts or systems of the machine.

SUMMARY OF THE DISCLOSURE

In an example embodiment, a cable accumulator for a plurality of input cables and at least one output cable is provided. The cable accumulator includes a bracket having an input end and an output end. The cable accumulator includes a carrier member slidably coupled with the bracket. The carrier member is slidable relative to the bracket between the input end and the output end. The carrier member includes a frame having a first end and a second end. The second end of the frame is coupled to the at least one output cable. The carrier member also includes a pin member coupled to the frame between the first end and the second end. The carrier member further includes a plurality of connecting members spaced apart from each other and slidably coupled with the pin member. The plurality of connecting members is adapted to slide relative to the pin member independently of each other. Each input cable from the plurality of input cables is coupled to a respective connecting member from the plurality of connecting members. An actuation of any one of the plurality of input cables causes the respective connecting member to pull the pin member to slide the carrier member relative to the bracket and to actuate the at least one output cable. Further, the respective connecting members coupled to non-actuated input cables from the plurality of input cables slide relative to the pin member in response to actuation of any one of the plurality of input cables.

In another example embodiment, a working machine is provided. The working machine includes a chassis and a plurality of ground engaging means adapted to support the chassis over a working surface. The working machine also includes a control mechanism. The control mechanism controls at least one operational parameter of the working machine. The control mechanism includes a plurality of input levers, a cable accumulator, a plurality of input cables, and at least one output cable. The cable accumulator includes a bracket having an input end and an output end. The cable accumulator also includes a carrier member slidably coupled with the bracket such that the carrier member is slidable relative to the bracket between the input end and the output end. The carrier member includes a frame having a first end and a second end and a pin member coupled to the frame between the first end and the second end. The carrier member also includes a plurality of connecting members spaced apart from each other and slidably coupled with the pin member. The plurality of connecting members slide relative to the pin member independently of each other. Each input cable from the plurality of input cables is coupled to a respective connecting member from the plurality of connecting members. Each of the plurality of input cables is further operatively coupled to a respective input lever from the plurality of input levers. The at least one output cable is coupled to the second end of the frame. Upon actuation, the at least one output cable controls the at least one operational parameter of the working machine. An actuation of any one of the plurality of input cables causes the respective connecting member to pull the pin member to slide the carrier member relative to the bracket and to actuate the at least one output cable. The respective connecting members coupled to non-actuated input cables from the plurality of input cables slide relative to the pin member in response to actuation of any one of the plurality of input cables.

In still another example embodiment, a control mechanism for a machine includes a cable accumulator, a plurality of input cables, and at least one output cable. The cable accumulator includes a bracket having an input end and an output end. The cable accumulator also includes a carrier member slidably coupled with the bracket such that the carrier member is slidable relative to the bracket between the input end and the output end. The carrier member includes a frame having a first end and a second end. The carrier member also includes a pin member fixedly coupled to the frame between the first end and the second end. The carrier member further includes a plurality of connecting members spaced apart from each other and slidably coupled with the pin member. The plurality of connecting members slide relative to the pin member independently of each other. Each of the plurality of connecting members defines a slot receiving the pin member therethrough, such that each of the plurality of connecting members is slidable relative to the pin member along a length of the slot. Moreover, the carrier member includes a plurality of biasing members corresponding to the plurality of connecting members. The plurality of biasing members is disposed between each of the plurality of connecting members and the first end of the frame. The plurality of input cables pass through the input end of the bracket. Each input cable from the plurality of input cables is coupled to a respective connecting member from the plurality of connecting members. The at least one output cable passes through the output end of the bracket. The at least one output cable is coupled to the second end of the frame. An actuation of any one of the plurality of input cables causes the respective connecting member to pull the pin member to slide the carrier member relative to the bracket and to actuate the at least one output cable. The respective connecting members coupled to non-actuated input cables from the plurality of input cables slide relative to the pin member in response to actuation of any one of the plurality of input cables.

In yet another example embodiment, a control mechanism for a machine includes a first fixing member, a second fixing member, a carrier member, a plurality of input cables, and at least one output cable. The carrier member is slidably coupled to the first and second fixing members between the first and second fixing members. The carrier member includes a frame having a first end and a second end. The carrier member also includes a pin member fixedly coupled to the frame between the first end and the second end. Further, the carrier member includes a plurality of connecting members spaced apart from each other and slidably coupled with the pin member. The plurality of connecting members are adapted to slide relative to the pin member independently of each other. Moreover, each of the plurality of connecting members defines a slot receiving the pin member therethrough, such that each of the plurality of connecting members is slidable relative to the pin member along a length of the slot. The carrier member also includes a plurality of biasing members corresponding to the plurality of connecting members. The plurality of biasing members are disposed between each of the plurality of connecting members and the first end of the frame. The plurality of input cables of the control mechanism pass through the first fixing member. Each input cable from the plurality of input cables is coupled to a respective connecting member from the plurality of connecting members. The at least one output cable of the control mechanism passes through the second fixing member. The at least one output cable is coupled to the second end of the frame. An actuation of any one of the plurality of input cables causes the respective connecting member to pull the pin member in order to slide the carrier member relative to the first and second fixing members and to actuate the at least one output cable. The respective connecting members coupled to non-actuated input cables from the plurality of input cables are configured to slide relative to the pin member in response to actuation of any one of the plurality of input cables.

DETAILED DESCRIPTION

Figure 1:
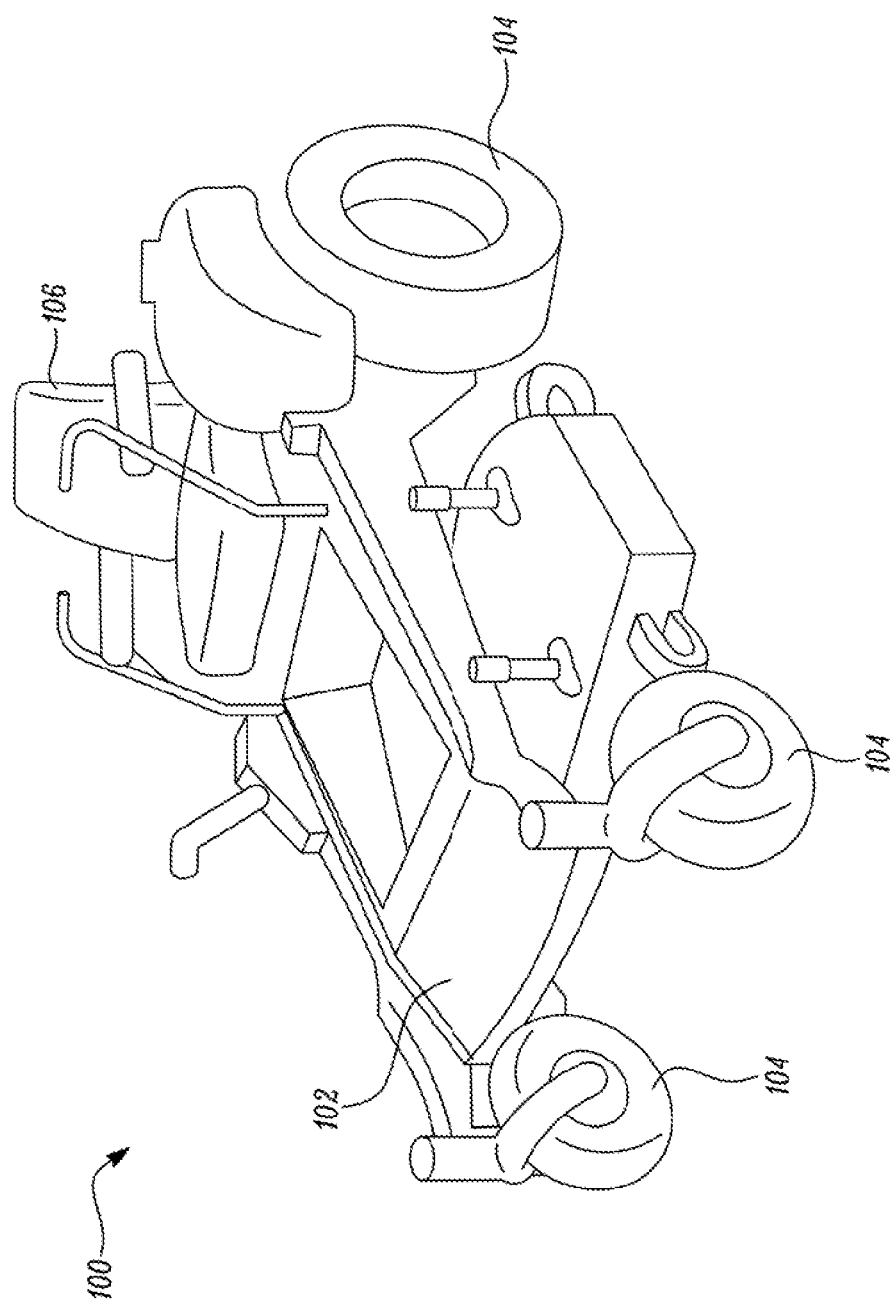
FIG. 1 illustrates a working machine, according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a working machine 100. Although the working machine 100 is illustrated as a riding type lawn mower, it should be contemplated that the working machine 100 may be any other type of a working machine as well, such as but not limited to an all-terrain vehicle (ATV), utility vehicle (UTV), or golf cart, which may be applicable with various aspects of the present disclosure. The present disclosure is not limited by a type of a working machine in any manner.

The working machine 100 includes a chassis 102. The chassis 102 is supported over a working surface by a plurality of ground engaging means 104. The ground engaging means 104 are illustrated as wheels. However, the ground engaging means 104 may be any other type of ground engaging means as well which may be suitable for application with various aspects of the present disclosure. In one embodiment, the ground engaging means 104 are tracks. The working machine 100 further includes an operator seat 106 for an operator to ride on and operate the working machine 100.

The working machine 100 may include various controls such that the operator may control operation of the working machine 100. For example, the working machine may include mechanisms for controlling acceleration, braking, and/or steering of the vehicle, such as pedals, steering wheels, control levers, or the like. The working machine 100 may also include various buttons, switches, levers, or other input mechanisms for controlling additional inputs into the working machine (e.g., ignition, power take off (PTO), all-wheel drive).

Figure 2:
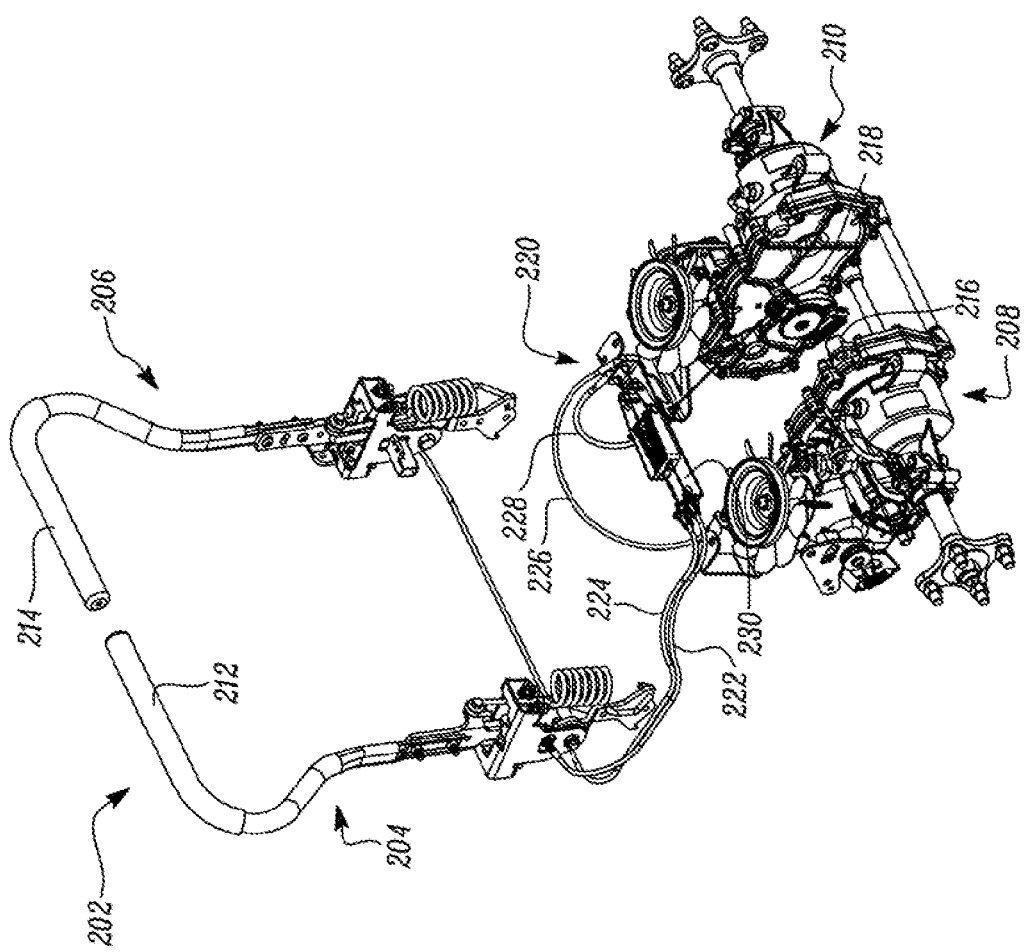
FIG. 2 illustrates a control mechanism for the working machine of FIG. 1, according to an example embodiment.

An exemplary control mechanism 202 is illustrated in FIG. 2. The control mechanism 202 includes a first control assembly 204 and a second control assembly 206. The first control assembly 204 and the second control assembly 206 may be used to control at least one operational parameter of the working machine 100. In an embodiment, first control assembly 204 and second control assembly 206 may be used to control machine velocity (i.e., forward/reverse direction and speed) and braking. The first control assembly 204 and second control assembly 206 may alternatively or additionally control other operational parameters of working machine 100. The first control assembly 204 and the second control assembly 206 are illustrated as similar to each other in FIG. 2. However, it should be contemplated that the first control assembly 204 and the second control assembly 206 may be structurally and/or functionally different from each other as well.

The present disclosure illustrates the operation of the control mechanism 202 to control one or more parking brakes. The control mechanism 202 may alternatively be used to control any other operational parameter as well. In one embodiment, the first control assembly 204 and the second control assembly 206 actuate respective transmission assemblies 208, 210 through a first input lever 212 and a second input lever 214, respectively. In an embodiment, the first input lever 212 actuates a first parking brake 216 associated with a first transmission assembly 208, and the second input lever 214 actuates a second parking brake 218 associated with a second transmission assembly 210.

In addition to actuating the first and second parking brakes 216, 218, first input lever and second input lever 212, 214 may actuate respective transmission assemblies 208, 210 to drive working machine 100 in forward and reverse directions. For example, a forward push of first and second input levers 212, 214 may cause the ground engaging means connected to the first and second transmission assemblies 208, 210 to rotate forward, whereas a rearward pull of the first and second input levers 212, 214 may cause the ground engaging means connected to the first and second transmission assemblies 208, 210 to rotate rearward. A forward/rearward movement of only one of the first and second input levers 212, 214 may cause ground engaging means 104 on only one side of the working machine 104 to rotate, thus causing working machine 100 to turn. Various movements of working machine 100 may be accomplished via different forward/rearward movements of first and second input levers 212, 214, as would be understood by one of skill in the art.

In one embodiment, control mechanism 202 further includes a plurality of input cables (e.g., first and second input cables 222, 224), at least one output cable (e.g., first and second output cables 226, 228), and a cable accumulator 220. The cable accumulator 220 is configured to receive the plurality of input cables and the at least one output cable. In the exemplary application of a cable accumulator shown in FIG. 2, cable accumulator 220 receives input from two input cables. The two input cables include first input cable 222 and second input cable 224. In other embodiments, cable accumulator 220 may receive inputs from fewer or more than two input cables. As shown in FIG. 2, first and second input cables 222, 224 are coupled to first and second input levers 212, 214, respectively. In an embodiment, the at least one output cable may be a single output cable. In another embodiment, the at least one output cable may include two output cables. For example, control mechanism 202 may include one output cable in systems in which inputs into cable accumulator 220 control the operation of only one receiving assembly (e.g., a parking brake for one transmission assembly). Alternatively, control mechanism may include two output cables in systems in which inputs into cable accumulator control the operation of two receiving assemblies (e.g., parking brakes for left and right transmission assemblies). In yet another embodiment, control mechanism 202 may include more than two output cables, such that the one or more input cables may control the operation of more than two receiving assemblies.

In the exemplary embodiment shown in FIG. 2, control mechanism 202 includes two output cables: a first output cable 226 and a second output cable 228. The first and second output cables 226, 228 are operatively coupled to the first parking brake 216 and the second parking brake 218, respectively. In FIG. 2, each of the input and output cables are illustrated as bowden cables. Each of the cables may include an outer cover enclosing an inner cable member which is coupled to cable accumulator 220. The inner cable member may be movable relative to the outer cover.

Figure 3:
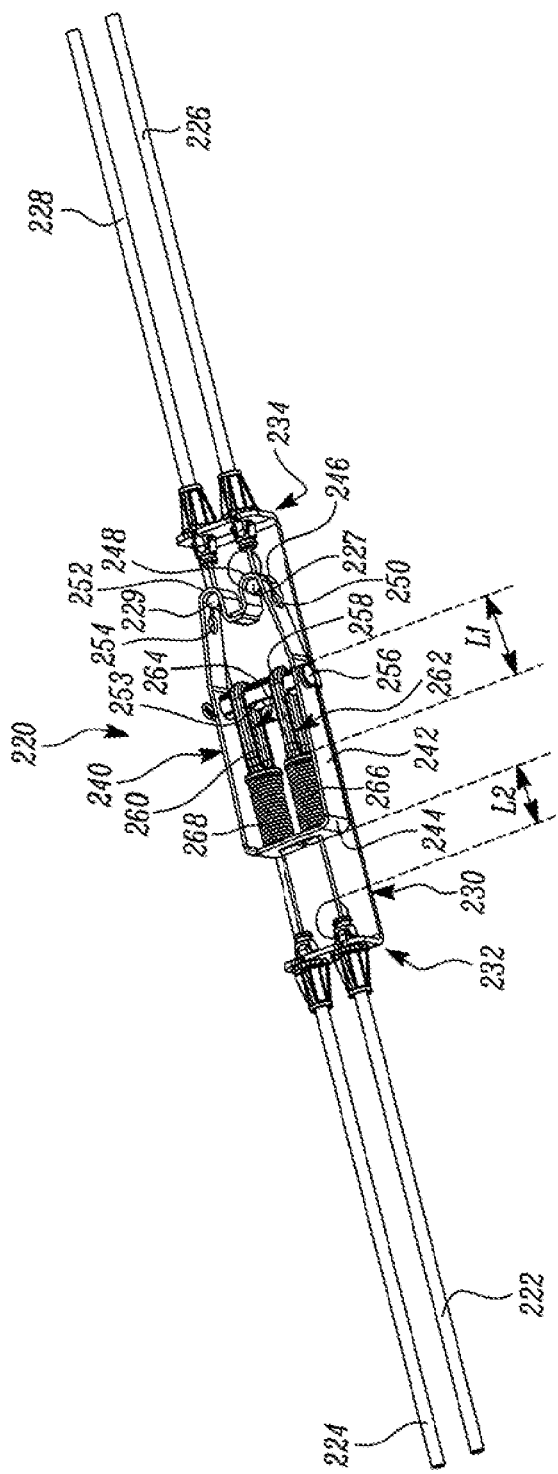
FIG. 3 illustrates a cable accumulator with two input cables in a non-actuated configuration, according to an example embodiment.

FIG. 3 illustrates additional structural details of the cable accumulator 220. The cable accumulator 220 includes a bracket 230 having an input end 232 and an output end 234. The input end 232 of the bracket 230 is defined as an end of the bracket 230 proximal to which the first and second input cables 222, 224 are coupled to the cable accumulator 220, and the output end 234 of the bracket 230 is defined as an end of the bracket 230 proximal to which the first and second output cables 226, 228 are coupled to the cable accumulator 220. In FIG. 3, the bracket 230 is illustrated as having a U-shaped configuration. The bracket 230 may be envisioned as a flat plate including two or more portions located at any point within the flat plate that are bent so as to form the input and output ends 232, 234 to allow the input and output cables to be coupled to the cable accumulator 220. However, it should be contemplated that the bracket 230 may have any other suitable shape or composition as well and the present disclosure is not limited by shape of the bracket 230 in any manner.

A carrier member 240 is slidably coupled with the bracket 230 such that the carrier member 240 is slidable relative to the bracket 230 between the input end 232 and the output end 234. The carrier member 240 has a frame 242 having a first end 244 and a second end 246. The first end 244 of the frame 242 is near to the input end 232 of the bracket 230, and the second end 246 of the frame 242 is near to the output end 234 of the bracket 230.

The second end 246 of the frame 242 is coupled to the first and second output cables 226, 228. The frame 242 defines two arcuate portions towards the second end 246 corresponding to the first and second output cables 226, 228. A first arcuate portion 248 defines a first aperture 250 to receive the first output cable 226, and a second arcuate portion 252 defines a second aperture 254 to receive the second output cable 228. The first and second output cables 226, 228 include engagement portions 227, 229 such that the first and second output cables 226, 228 are received and retained within first and second apertures 252, 254. In one embodiment, the first and second output cables 226, 228 are received within first and second apertures 252, 254 in one orientation of the engagement portions 227, 229 and rotated once within first and second apertures 252, 254, such that the first and second output cables 226, 228 are retained within first and second apertures 252, 254.

The carrier member 240 includes a pin member 256 coupled to the frame 242 between the first end 244 and the second end 246. In an embodiment, the pin member 256 is fixedly and transversely coupled to the frame 242. The carrier member 240 further includes a plurality of connecting members. Each input cable from the plurality of input cables is coupled to a respective connecting member from the plurality of connecting members. In the embodiment illustrated in FIG. 3, the carrier member 240 includes a first connecting member 258 and a second connecting member 260. However, the number of connecting members may vary as per application requirements, and the present disclosure is not limited by number of connecting members in any manner. For example, the number of connecting members may be equal to the number of input cables, such that each input cable is coupled to the pin member 256 via a different connecting member.

The first and second connecting members 258, 260 are spaced apart from each other and slidably coupled with the pin member 256. In one embodiment, a spacer 253 including a plurality of cutouts (i.e., one for each connecting member) surrounds pin member 256, such that each connecting member (e.g., first and second connecting members 258, 260) is fixed within the cutouts to prevent movement along the pin member 256. The first and second connecting members 258, 260 are coupled to the first and second input cables 222, 224 respectively through extension portions (not visible) extending from the first and second connecting members 258, 260. The first and second connecting members 258, 260 may be coupled to the first and second input cables 222, 224 by any suitable mechanical fastening means. The present disclosure is not limited by type of coupling between the input cables and the connecting members in any manner.

Each of the first and second connecting members 258, 260 is structurally similar to the other. The first connecting member 258 defines a first slot 262 and the second connecting member 260 defines a second slot 264. The first connecting member 258 is coupled to the frame 242 by receiving the pin member 256 within the first slot 262. Similarly, the second connecting member 260 is coupled to the frame 242 by receiving the pin member 256 within the second slot 264. The first and second connecting members 258, 260 are slidable relative to the pin member 256 along the length of the first and second slots 262, 264, respectively. The first and second connecting members 258, 260 slide relative to the pin member 256 independently of each other. In an embodiment, a length L1 of each of the slots is substantially equal to a length of travel L2 of the carrier member 240 in response to actuation of any one of the first and second input cables 222, 224.

The cable accumulator 220 is illustrated in FIG. 3 with both the first and second input cables 222, 224 in non-actuated configuration. As shown in FIG. 3, the cable accumulator 220 further includes a first biasing member 266 provided between the first connecting member 258 and the first end 244 of the frame 242 and a second biasing member 268 provided between the second connecting member 260 and the first end 244 of the frame 242. Both the first and second biasing members 266, 268 are in normal (or compressed) state. The carrier member 240 lies nearer to the output end 234 of the bracket 230 than to the input end 232 of the bracket 230, and the first and second output cables 226, 228 are non-actuated as well.

Figure 4:
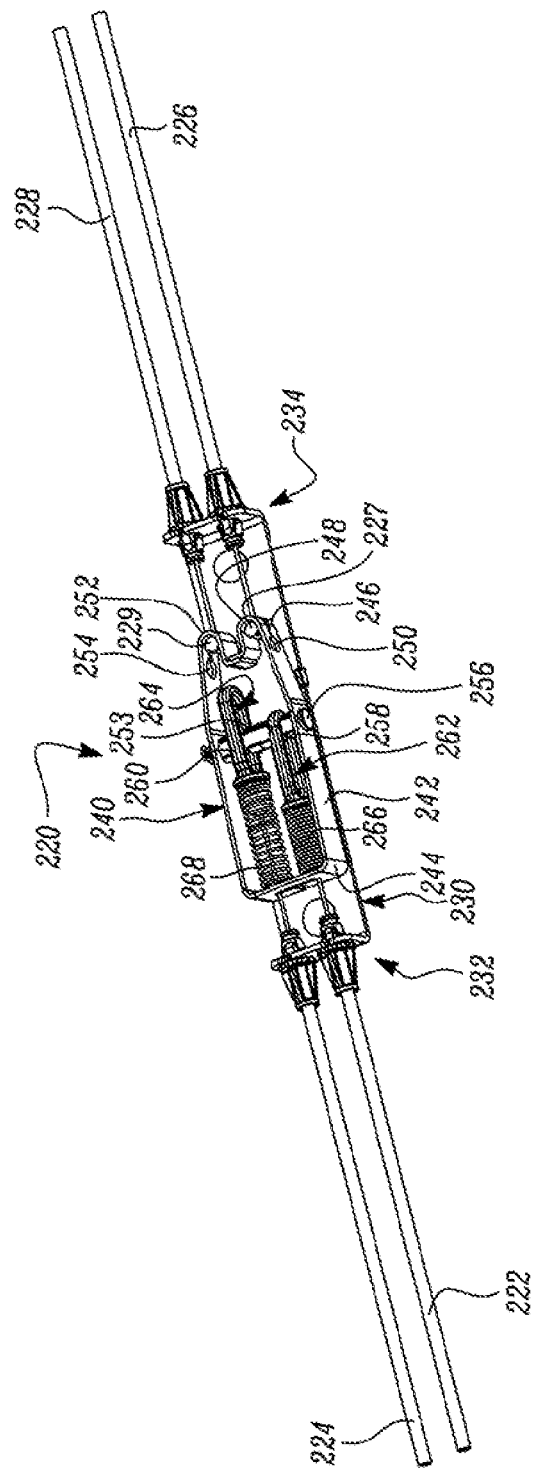
FIG. 4 illustrates a cable accumulator with a first input cable in an actuated configuration and a second input cable in a non-actuated configuration, according to an example embodiment.

FIG. 4 shows the cable accumulator 220 with the first input cable 222 in actuated configuration and the second input cable 224 in non-actuated configuration. When the first input cable 222 is actuated, the first connecting member 258 pulls the pin member 256 at the end of first slot 262. This pulling action causes the carrier member 240 to slide relative to the bracket 230 towards the input end 232 of the bracket 230. Sliding movement of the carrier member 240 actuates (or pulls) the first output cable 226 and the second output cable 228 relative to the output end 234.

Meanwhile, in FIG. 4, the second input cable 224 remains non-actuated and unmoved. The second biasing member 268 extends to accommodate the increase in distance between the second connecting member 260 and the first end 244 of the carrier member 240 as the carrier member 240 moves toward the input end 232 of the bracket 230. The extension of the second biasing member 268 causes the second input cable 224 to remain taut (i.e., maintain tension) during actuation of the first input cable 222, such that the second input cable 224 and second connecting member 260 do not become loose (or dangle) within carrier member 240 as carrier member 240 slides within bracket 230. The pin member 256 slides within the second slot 264 of the second connecting member 260 as a result of actuation of the first input cable 222.

Figure 5:
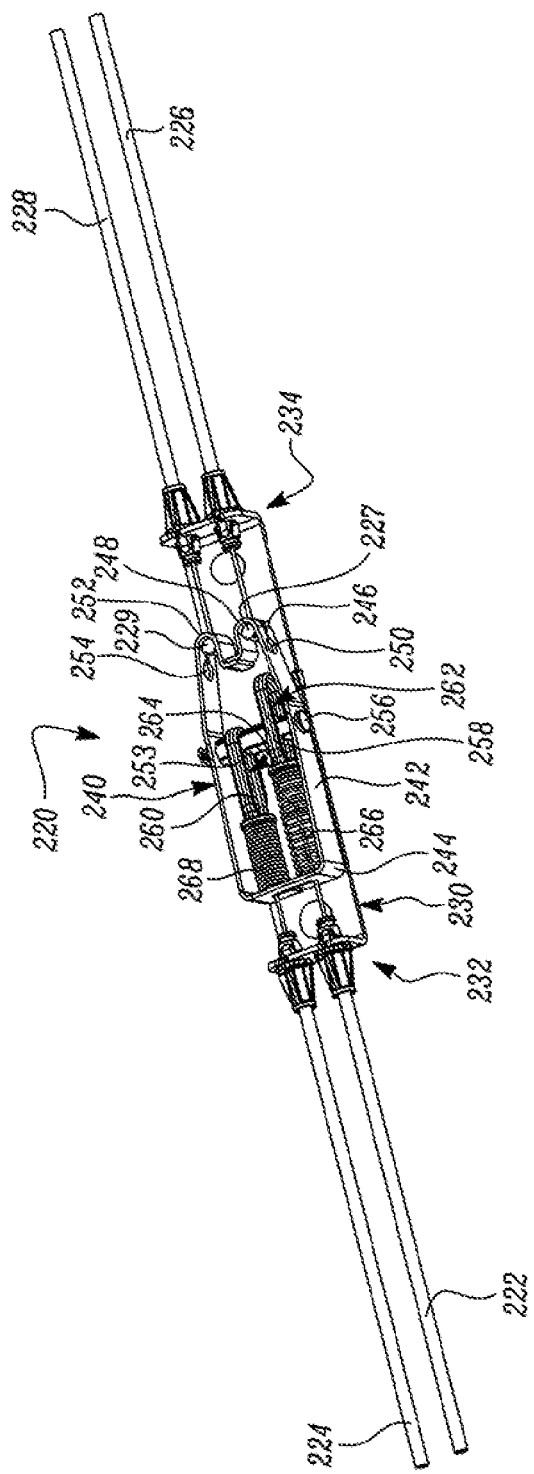
FIG. 5 illustrates a cable accumulator with a first input cable in a non-actuated configuration and a second input cable in an actuated configuration, according to an example embodiment.

Similar actuation functionality can be envisioned with the second input cable 224 being actuated, and the first input cable 222 being non-actuated as shown in FIG. 5. Actuation of any one of the plurality of input cables causes the respective connecting member to pull the pin member 256 in order to slide the carrier member 240 relative to the bracket 230 and to actuate the at least one output cable. Specifically, any one of the first and second input cables 222, 224 may actuate both the first and second output cables 226, 228. In embodiments with more than two input and/or output cables, actuation of any one of the input cables may cause actuation of all of the output cables.

The respective connecting members coupled to non-actuated input cables from the plurality of input cables are configured to slide relative to the pin member 256 in response to actuation of any one of the plurality of input cables. Specifically, actuation of any one of the first and second input cables 222, 224 may not affect a non-actuated state of the other input cable 222 or 224. In embodiments with more than two input cables, actuation of any one of the input cables may not affect a non-actuated state of any other input cable.

Figure 6:
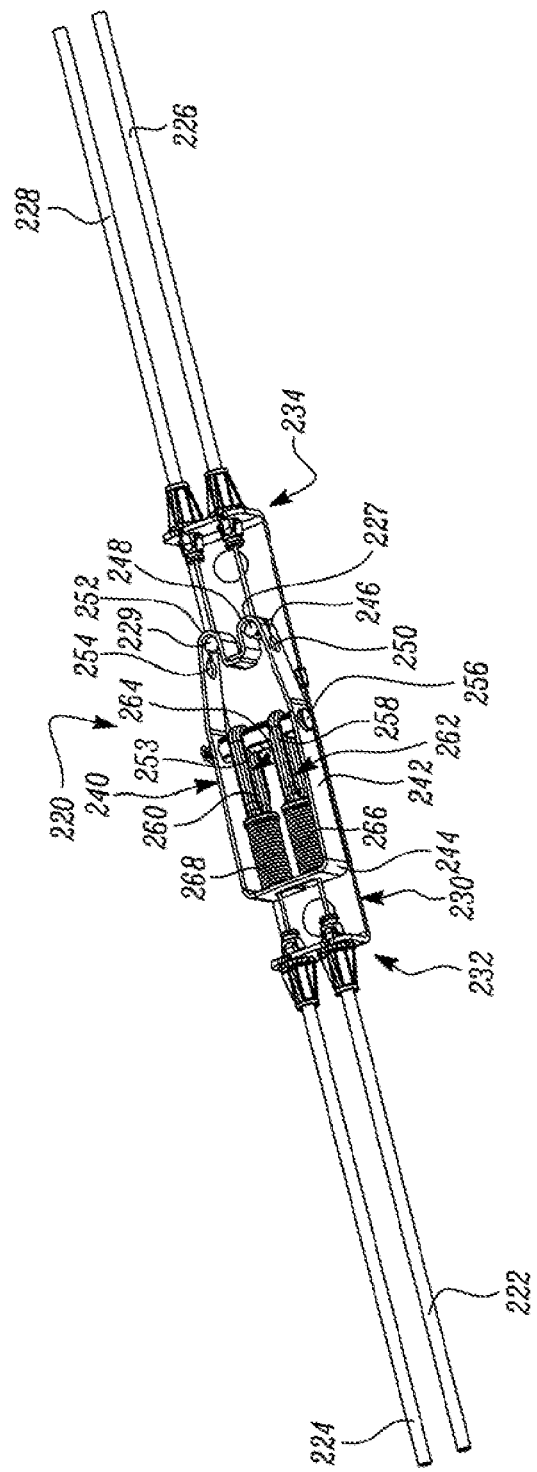
FIG. 6 illustrates a cable accumulator with two input cables in an actuated configuration, according to an example embodiment.

FIG. 6 shows both the first input cable 222 and the second input cable 224 in actuated configuration. The first connecting member 258 and the second connecting member 260 pull the pin member 256 and cause the carrier member 240 to slide towards the input end 232 of the bracket 230. Sliding movement of the carrier member 240 actuates the first output cable 226 and the second output cable 228.

Regardless of whether only the first input cable 222 is actuated (as shown in FIG. 4), only the second input cable 224 is actuated (as shown in FIG. 5), or both the first input cable 222 and the second input cable 224 are actuated (as shown in FIG. 6), the effect on the position of the carrier member 240, the first output cable 226, and the second output cable 228 will be the same. In other words, an actuation of either the first input cable 222 or the second input cable 224, or an actuation of both the first input cable 222 and the second input cable 224, will result in the same movement of the carrier member 240, the first output cable 226, and the second output cable 228.

With combined reference to FIGS. 2-6, the operator may use control mechanism 202 to actuate one or more parking brakes using one of three movements (or modes). A first mode is defined as actuation through the first input lever 212. When the operator moves the first input lever 212 from a neutral position to a park position, while leaving the second input lever 214 in the neutral position, the first input lever 212 actuates (or pulls) the first input cable 222, which in turn actuates the cable accumulator 220 by pulling the carrier member 240 toward the input end 232 of the bracket 230. This movement of the carrier member 240 causes actuation of the first and second parking brakes 216, 218 via the first and second output cables 226, 228, while allowing the second input cable 224 to remain unmoved, as the pin member 256 slides through the second slot 264 of the second connecting member 260.

A second mode is defined as actuation through the second input lever 214. When the operator moves the second input lever 214 from a neutral position to a park position, while leaving the first input lever 212 in the neutral position, the second input lever 214 actuates (or pulls) the second input cable 224, which in turn actuates the cable accumulator 220 by pulling the carrier member 240 toward the input end 232 of the bracket 230. This movement of the carrier member 240 causes actuation of the first and second parking brakes 216, 218 while allowing the first input cable 222 to remain unmoved, as the pin member 256 slides through the first slot 262 of the first connecting member 258.

A third mode is defined as actuation through both the first input lever 212 and the second input lever 214. When the operator moves both the first and second input levers 212, 214 from a neutral position to a park position, the first input lever 212 actuates (or pulls) the first input cable 222 and the second input lever 214 actuates (or pulls) the second input cable 224, both of which in turn actuate the cable accumulator 220 by pulling the carrier member 240 toward the input end 232 of the bracket 230. This movement of the carrier member 240 causes actuation of the first and second parking brakes 216, 218.

In one embodiment, the neutral position of an input lever (e.g., first and second input levers 212, 214) may correspond to an upright and laterally inward orientation of the input lever. The park position of an input lever may correspond to a laterally outward orientation of the input lever. Thus, in this embodiment, the operator may activate the parking brake(s) by pushing one or both input levers 212, 214 laterally outward (i.e., to the left and right of the operator while seated). In another embodiment (not shown), the neutral position of an input lever may correspond to an upright and laterally inward orientation of the input lever, but the operator may activate the parking brake by axially twisting one or both input levers 212, 214, such that the handle(s) of the twisted input lever(s) point forward (i.e., away from the operator). Thus, in this alternative embodiment, the park position for an input levers would correspond to an upright, axially rotated orientation of the input lever. Other positions and movements of the input levers are also within the scope of this disclosure, so long as movement from one input lever position to the other would result in the pulling of a corresponding input cable, as would be understood by one of ordinary skill in the art.

Figure 7:
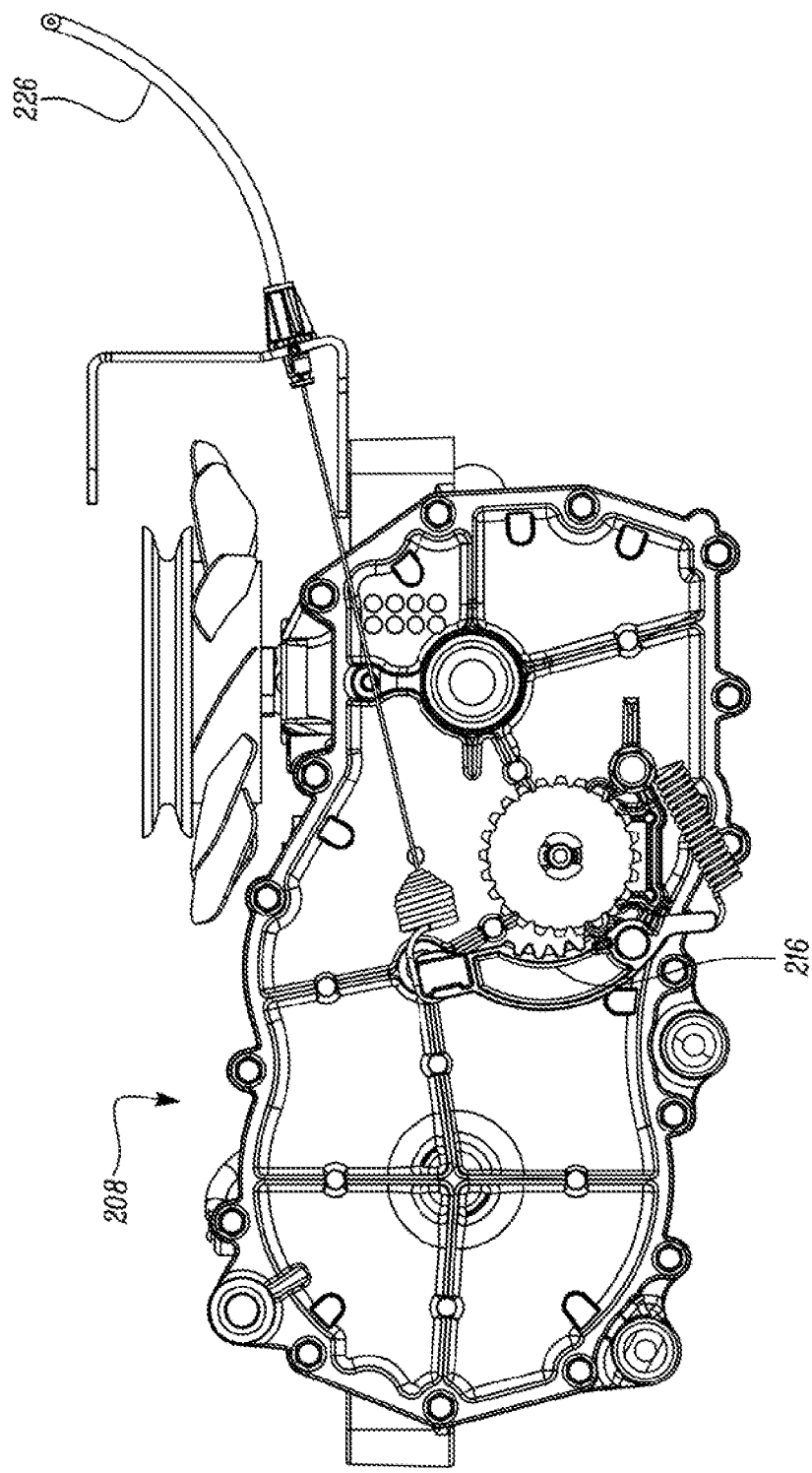
FIG. 7 illustrates a side view of a transmission assembly with a parking brake in a disengaged position, according to an example embodiment.
Figure 8:
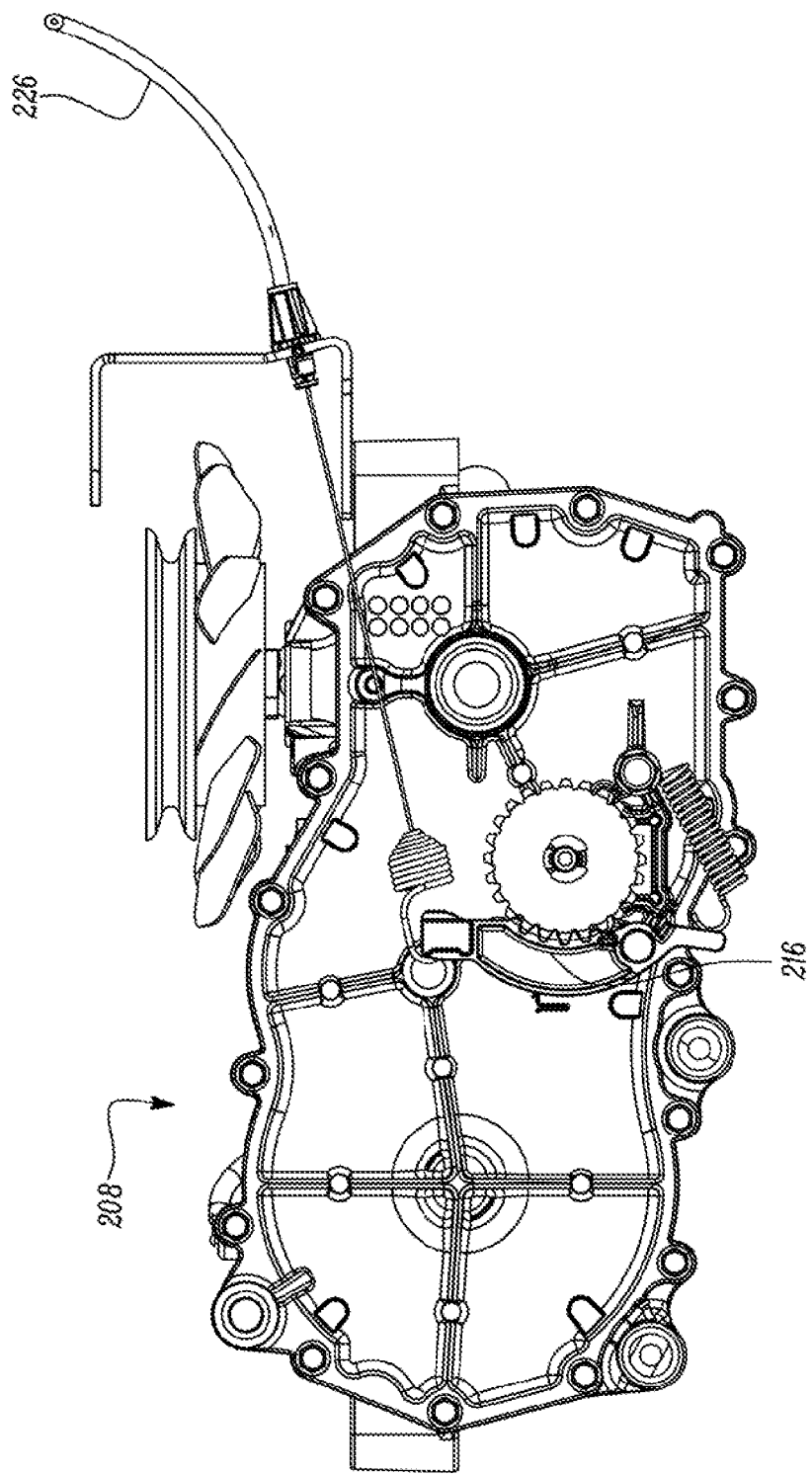
FIG. 8 illustrates a side view of a transmission assembly with a parking brake in an engaged position, according to an example embodiment.

FIG. 7 shows a side view of a first transmission assembly 208 with the first parking brake 216 in disengaged position. The first output cable 226 is configured to actuate the first parking brake 216. As shown in FIG. 8, when the first input cable 222 and/or second input cable 224 is actuated via movement of the first input lever 212 and/or second input lever 214 from neutral to park position, the first output cable 226 actuates the first parking brake 216. More specifically, the actuation of the first input lever 212 and/or second input lever 214 results in a pull of the first output cable 226, which is connected to and thereby pulls a pawl into contact with a notched wheel on the output shaft of the first transmission assembly 208, thus preventing movement of the output shaft (and connected wheel or track). It should be contemplated that the second transmission assembly 210 functions similarly to the first transmission assembly 208 with respect to activation of the parking brake. More particularly, the actuation of the first input lever 212 and/or second input lever 214 results in a pull of the second output cable 228, which is connected to and thereby pulls a pawl into contact with a notched wheel on the output shaft of the second transmission assembly 210, thus preventing movement of the output shaft (and connected wheel). Moreover, the actuation of the first input lever 212 and/or second input lever 214 results in a simultaneous pull of the first output cable 226 and second output cable 228, such that the first parking brake 216 and the second parking brake 218 are actuated at the same time.

It should be appreciated that example embodiments of the present invention provide a new type of cable accumulator. Example embodiments may provide a cable accumulator for a plurality of input cables and at least one output cable. The cable accumulator may include a bracket having an input end and an output end. The cable accumulator may also include a carrier member slidably coupled with the bracket such that the carrier member is slidable relative to the bracket between the input end and the output end. The carrier member may include a frame having a first end and a second end. The second end of the frame may be coupled to the at least one output cable. The carrier member may also include a pin member coupled to the frame between the first end and the second end. Moreover, the carrier member may include a plurality of connecting members spaced apart from each other and slidably coupled with the pin member. The plurality of connecting members may be adapted to slide relative to the pin member independently of each other. Each input cable from the plurality of input cables may be coupled to a respective connecting member from the plurality of connecting members. An actuation of any one of the plurality of input cables may cause the respective connecting member to pull the pin member in order to slide the carrier member relative to the bracket and to actuate the at least one output cable. The respective connecting members coupled to non-actuated input cables from the plurality of input cables may be configured to slide relative to the pin member in response to actuation of any one of the plurality of input cables.

In some cases, the cable accumulator may include additional optional features, structures or components, or the components described above may be augmented, modified or improved. Such augmentations, modifications or improvements can be added or subtracted in any combination. For example, in some cases, each of the plurality of connecting members within the carrier member of the cable accumulator defines a slot receiving the pin member therethrough, such that each of the plurality of connecting members is slidable relative to the pin member along a length of the slot. The length of each slot may be substantially equal to a length of travel of the carrier member due to actuation of any one of the plurality of input cables. In some embodiments, the pin member of the carrier member is fixedly coupled to the frame. In some embodiments, the cable accumulator comprises a biasing member disposed between each of the plurality of connecting members and the first end of the frame. The biasing member may be adapted to extend to maintain tension in a non-actuated input cable as the carrier member slides in response to an actuated input cable.

Many modifications and other embodiments of the inventions set forth herein will come to mind to one skilled in the art to which these inventions pertain having the benefit of the teachings presented in the foregoing descriptions and the associated drawings. For example, in some embodiments, bracket 230 is replaced by a first fixing member and a second fixing member, which provide a similar function to input end 232 and output end 234 of bracket 230, respectively. In these embodiments, the first and second fixing members may be separately attached to the chassis of working machine 100, such that they are not two ends of the same sub-component of the machine (i.e., a bracket). Thus, the carrier member 240 may be slidably coupled to and move between the first and second fixing members, rather than the input end and output end of a single piece of metal or other material (e.g., bracket 230). Moreover, in these embodiments, a plurality of input cables may pass through the first fixing member (rather than through the input end 232 of the bracket 230), and at least one output cable may pass through the second fixing member (rather than through the output end 234 of the bracket 230).

Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

LIST OF ELEMENTS

100 Working machine
102 Chassis
104 Ground engaging means
106 Operator seat
202 Control mechanism
204 First control assembly
206 Second control assembly
208 First transmission assembly
210 Second transmission assembly
212 First input lever
214 Second input lever
216 First parking brake
218 Second parking brake
220 Cable accumulator
222 First input cable
224 Second input cable
226 First output cable
227 Engagement portion
228 Second output cable
229 Engagement portion
230 Bracket
232 Input end of bracket
234 Output end of bracket
240 Carrier member
242 Frame
244 First end of frame
246 Second end of frame
248 First arcuate portion
250 First aperture
252 Second arcuate portion
254 Second aperture
256 Pin member
258 First connecting member
260 Second connecting member
262 First slot
264 Second slot
266 First biasing member
268 Second biasing member
L1 Length of slots
L2 Length of travel of carrier member

The invention claimed is:

1. A cable accumulator for a plurality of input cables and at least one output cable, the cable accumulator comprising:
a bracket having an input end and an output end; and
a carrier member slidably coupled with the bracket such that the carrier member is slidable relative to the bracket between the input end and the output end, the carrier member including:
a frame having a first end and a second end, wherein the second end of the frame is coupled to the at least one output cable;
a pin member coupled to the frame between the first end and the second end; and
a plurality of connecting members spaced apart from each other and slidably coupled with the pin member, wherein the plurality of connecting members is adapted to slide relative to the pin member independently of each other, wherein each input cable from the plurality of input cables is coupled to a respective connecting member from the plurality of connecting members;
wherein an actuation of any one of the plurality of input cables causes the respective connecting member to pull the pin member in order to slide the carrier member relative to the bracket and to actuate the at least one output cable; and
wherein the respective connecting members coupled to non-actuated input cables from the plurality of input cables are configured to slide relative to the pin member in response to actuation of any one of the plurality of input cables.

2. The cable accumulator of claim 1, wherein each of the plurality of connecting members defines a slot receiving the pin member therethrough, such that each of the plurality of connecting members is slidable relative to the pin member along a length of the slot.

3. The cable accumulator of claim 2, wherein a length of each slot is substantially equal to a length of travel of the carrier member due to actuation of any one of the plurality of input cables.

4. The cable accumulator of claim 1, wherein the pin member is fixedly coupled to the frame.

5. The cable accumulator of claim 1, further comprising a biasing member disposed between each of the plurality of connecting members and the first end of the frame.

6. The cable accumulator of claim 5, wherein the biasing member is adapted to extend to maintain tension in a non-actuated input cable as the carrier member slides in response to an actuated input cable.

7. A working machine comprising:
a chassis;
a plurality of ground engaging means adapted to support the chassis over a working surface; and
a control mechanism adapted to control at least one operational parameter of the working machine, the control mechanism comprising:
a plurality of input levers;
a cable accumulator, the cable accumulator including:
a bracket having an input end and an output end; and
a carrier member slidably coupled with the bracket such that the carrier member is slidable relative to the bracket between the input end and the output end, the carrier member including:
a frame having a first end and a second end;
a pin member coupled to the frame between the first end and the second end; and
a plurality of connecting members spaced apart from each other and slidably coupled with the pin member, wherein the plurality of connecting members are adapted to slide relative to the pin member independently of each other;
a plurality of input cables, each input cable from the plurality of input cables coupled to a respective connecting member from the plurality of connecting members, each of the plurality of input cables further operatively coupled to a respective input lever from the plurality of input levers; and
at least one output cable, the at least one output cable coupled to the second end of the frame, wherein upon actuation the at least one output cable controls the at least one operational parameter of the working machine;

wherein an actuation of any one of the plurality of input cables causes the respective connecting member to pull the pin member in order to slide the carrier member relative to the bracket and to actuate the at least one output cable; and wherein the respective connecting members coupled to non-actuated input cables from the plurality of input cables are configured to slide relative to the pin member in response to actuation of any one of the plurality of input cables.

8. The working machine of claim 7, wherein each of the plurality of connecting members defines a slot receiving the pin member therethrough, such that each of the plurality of connecting members is slidable relative to the pin member along a length of the slot.

9. The working machine of claim 8, wherein a length of each slot is substantially equal to a length of travel of the carrier member due to actuation of any one of the plurality of input cables.

10. The working machine of claim 7, wherein the pin member is fixedly coupled to the frame.

11. The working machine of claim 7, further comprising a biasing member disposed between each of the plurality of connecting members and the first end of the frame.

12. The working machine of claim 11, wherein the biasing member is adapted to extend to maintain tension in a non-actuated input cable as the carrier member slides in response to an actuated input cable.

13. A control mechanism for a machine, the control mechanism comprising:
a cable accumulator comprising:
a bracket having an input end and an output end; and
a carrier member slidably coupled with the bracket such that the carrier member is slidable relative to the bracket between the input end and the output end, the carrier member including:
a frame having a first end and a second end;
a pin member fixedly coupled to the frame between the first end and the second end;
a plurality of connecting members spaced apart from each other and slidably coupled with the pin member, wherein the plurality of connecting members are adapted to slide relative to the pin member independently of each other, and wherein each of the plurality of connecting members defines a slot receiving the pin member therethrough, such that each of the plurality of connecting members is slidable relative to the pin member along a length of the slot; and
a plurality of biasing members corresponding to the plurality of connecting members, the plurality of biasing members being disposed between each of the plurality of connecting members and the first end of the frame;
a plurality of input cables passing through the input end of the bracket, each input cable from the plurality of input cables coupled to a respective connecting member from the plurality of connecting members; and
at least one output cable passing through the output end of the bracket, the at least one output cable coupled to the second end of the frame;

wherein an actuation of any one of the plurality of input cables causes the respective connecting member to pull the pin member in order to slide the carrier member relative to the bracket and to actuate the at least one output cable; and wherein the respective connecting members coupled to non-actuated input cables from the plurality of input cables are configured to slide relative to the pin member in response to actuation of any one of the plurality of input cables.

14. The control mechanism of claim 13, wherein a length of each slot is substantially equal to a length of travel of the carrier member due to actuation of any one of the plurality of input cables.

15. The control mechanism of claim 13, wherein the biasing member is adapted to extend to maintain tension in a non-actuated input cable as the carrier member slides in response to an actuated input cable.

16. A control mechanism for a machine, the control mechanism comprising:
a first fixing member;
a second fixing member;
a carrier member slidably coupled to the first and second fixing members between the first and second fixing members, the carrier member including:
a frame having a first end and a second end;
a pin member fixedly coupled to the frame between the first end and the second end;
a plurality of connecting members spaced apart from each other and slidably coupled with the pin member, wherein the plurality of connecting members are adapted to slide relative to the pin member independently of each other, and wherein each of the plurality of connecting members defines a slot receiving the pin member therethrough, such that each of the plurality of connecting members is slidable relative to the pin member along a length of the slot; and
a plurality of biasing members corresponding to the plurality of connecting members, the plurality of biasing members being disposed between each of the plurality of connecting members and the first end of the frame;
a plurality of input cables passing through the first fixing member, each input cable from the plurality of input cables coupled to a respective connecting member from the plurality of connecting members; and
at least one output cable passing through the second fixing member, the at least one output cable coupled to the second end of the frame;

wherein an actuation of any one of the plurality of input cables causes the respective connecting member to pull the pin member in order to slide the carrier member relative to the first and second fixing members and to actuate the at least one output cable; and wherein the respective connecting members coupled to non-actuated input cables from the plurality of input cables are configured to slide relative to the pin member in response to actuation of any one of the plurality of input cables.

* * * * *